US006654202B2

United States Patent
Rea et al.

(10) Patent No.: US 6,654,202 B2
(45) Date of Patent: Nov. 25, 2003

(54) DISC DRIVE WITH LAYERED WRITE COIL

(75) Inventors: Christopher J. Rea, Eden Prairie, MN (US); Ladislav R. Pust, Savage, MN (US); Anthony M. Mack, Minneapolis, MN (US)

(73) Assignee: Seagate Technology LLC, Scotts Valley, CA (US)

(*) Notice: Subject to any disclaimer, the term of this patent is extended or adjusted under 35 U.S.C. 154(b) by 0 days.

(21) Appl. No.: 09/880,344

(22) Filed: Jun. 13, 2001

(65) Prior Publication Data

US 2001/0053044 A1 Dec. 20, 2001

Related U.S. Application Data

(60) Provisional application No. 60/213,088, filed on Jun. 20, 2000.

(51) Int. Cl.[7] .................................................. G11B 5/17
(52) U.S. Cl. ...................................................... 360/123
(58) Field of Search ................................. 360/123, 124, 360/119, 125

(56) References Cited

U.S. PATENT DOCUMENTS

| 4,219,854 A | | 8/1980 | Church et al. ............... 360/123 |
| 4,394,699 A | | 7/1983 | Kaminaka et al. ........... 360/113 |
| 5,113,300 A | * | 5/1992 | Ikeda et al. .................. 360/126 |
| 5,173,826 A | | 12/1992 | Bischoff ...................... 360/126 |
| 5,420,736 A | | 5/1995 | Heim et al. .................. 360/113 |
| 5,559,653 A | * | 9/1996 | Shouji et al. ................ 360/122 |
| 5,609,948 A | | 3/1997 | David et al. ................. 428/216 |
| 5,731,936 A | | 3/1998 | Lee et al. .................... 360/113 |
| 5,751,510 A | | 5/1998 | Smith et al. ................... 360/67 |
| 5,790,334 A | | 8/1998 | Cunningham ................ 360/66 |
| 5,875,080 A | | 2/1999 | Seagle ......................... 360/123 |
| 5,930,086 A | | 7/1999 | Chaug et al. ................ 360/113 |
| 5,995,342 A | | 11/1999 | Cohen et al. ................ 360/126 |
| 6,032,353 A | | 3/2000 | Hiner et al. ............... 29/603.14 |
| 6,198,597 B1 | * | 3/2001 | Tateyama et al. ........... 360/122 |
| 6,278,579 B1 | * | 8/2001 | Narumi et al. .............. 360/126 |
| 6,306,311 B1 | * | 10/2001 | Han et al. ...................... 216/22 |
| 6,317,288 B1 | * | 11/2001 | Sasaki ......................... 360/126 |
| 6,333,830 B2 | * | 12/2001 | Rose et al. .................. 360/123 |

FOREIGN PATENT DOCUMENTS

| JP | 58073010 | 5/1983 |
| JP | 58073011 | 5/1983 |

* cited by examiner

*Primary Examiner*—Carl Whitehead, Jr.
*Assistant Examiner*—Jennifer M Dolan
(74) *Attorney, Agent, or Firm*—Westman, Champlin & Kelly

(57) ABSTRACT

A disc drive includes a disc and a read/write head accessing the disc. The head includes a thermally conductive substrate and a write coil window surrounded by a shared pole piece thermally coupled to the substrate, a central core, a write pole piece and a write gap. A bottom coil adjacent the shared pole piece has multiple turns that have bottom narrowed regions passing through the window. A top coil adjacent the write pole piece has multiple turns that have top narrowed regions passing through the window. The top turns are fewer in number and flattened relative to the bottom turns.

25 Claims, 5 Drawing Sheets

DISC DRIVE WITH LAYERED WRITE COIL

CROSS-REFERENCE TO RELATED APPLICATION

This application claims priority benefits from U.S. Provisional Application 60/213,088 titled "Reduced Thermal Susceptibility MR Head design," filed Jun. 20, 2000.

FIELD OF THE INVENTION

This invention relates to disc drive storage devices. In particular, this invention relates to read/write heads for such disc drive storage devices.

BACKGROUND OF THE INVENTION

After a disc drive is energized, it warms up and has a temperature rise. In particular, there are large temperature rises in the heads used in a disc drive. The heads include magnetic transducers deposited on slider substrates. The magnetic transducers carry read/write currents that generate heat in the heads. The temperature rise in the heads is large because the heads have a small surface area in relation to the amount of heat that is dissipated in the magnetic transducers.

In newer, higher performance disc drives, the discs have increased areal density, rotational speeds and magnetic coercivity. With increased areal density, the dimensions of the magnetic transducer, such as write tip width and gap, are made correspondingly smaller. With increased areal density and rotational speeds, the operating frequency of the magnetic transducer increases. Inductances and capacitances in a write coil need to be smaller to operate at the higher frequencies and provide fast transient response. The write coil passes through a "window" in a write core structure, and this window is made smaller to reduce inductance in the write coil. With the smaller window, there are increased power losses in the write coil, particularly where the write coil passes through the narrowed "window" of the write core structure.

The increased magnetic coercivities of newer higher areal density magnetic discs and the decreased write tip width combine to increase the need for magnetomotive force or ampere-turns in the write coil, further increasing power losses in the write coil.

This size of the magnetic transducer has scaled down at the same time that the power losses in the write coil have increased, leading to higher magnetic transducer temperatures and reliability problems.

A disc drive is needed with a magnetic transducer that can be used with high performance discs, while reducing reliability problems associated with higher power losses and high temperatures in the magnetic transducer.

SUMMARY OF THE INVENTION

A disc drive includes a disc and a read/write head accessing the disc. The head includes a thermally conductive substrate and a write coil window surrounded by a shared pole piece thermally coupled to the substrate, a central core, a write pole piece and a write gap. A bottom coil adjacent the shared pole piece has multiple turns that have bottom narrowed regions passing through the window. A top coil adjacent the write pole piece has multiple turns that have top narrowed regions passing through the window. The top turns are fewer in number and flattened relative to the bottom turns.

These and various other features as well as advantages which characterize the present invention will be apparent upon reading of the following detailed description and review of the associated drawings.

DETAILED DESCRIPTION OF ILLUSTRATIVE EMBODIMENTS

Figure 1:
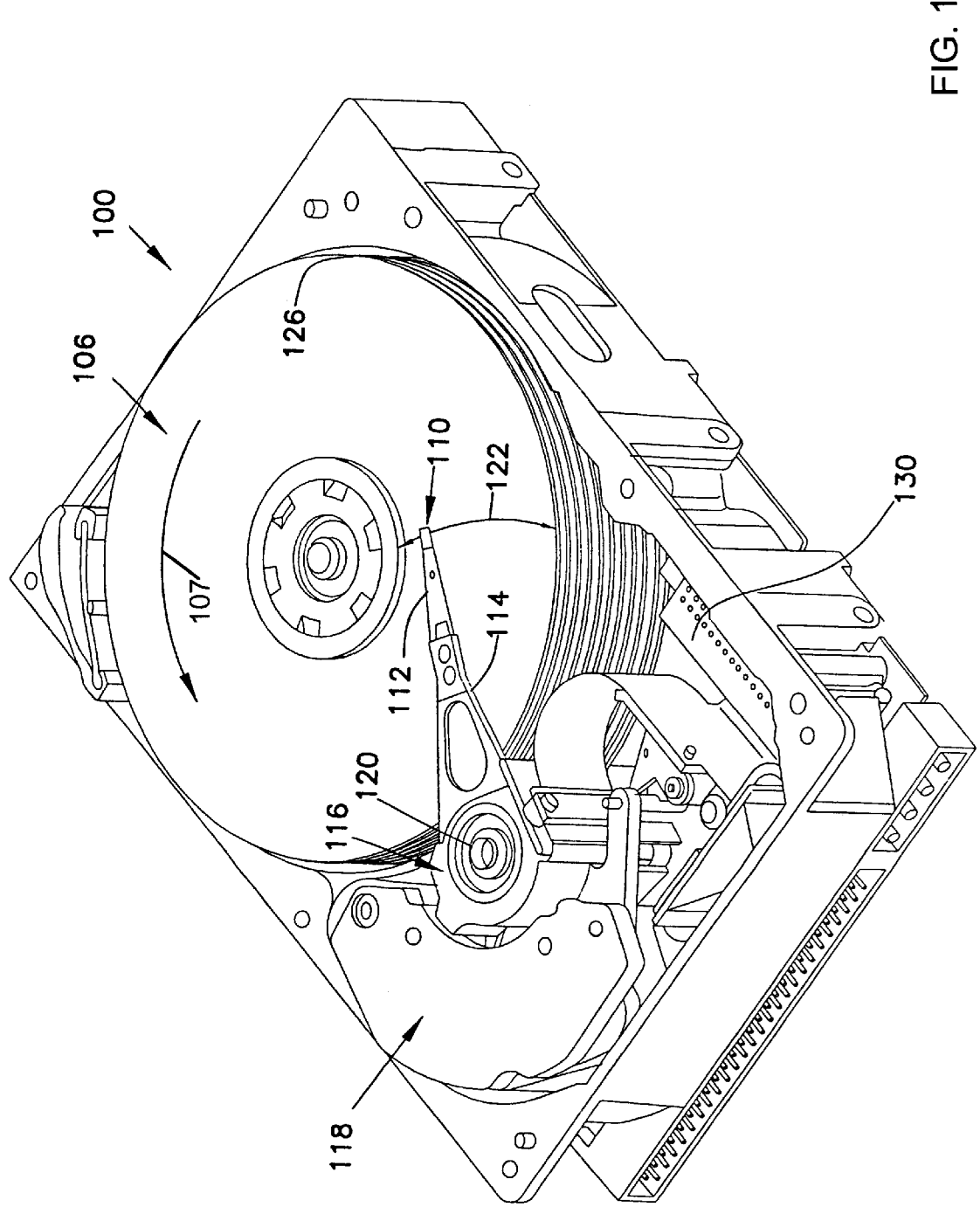
FIG. 1 illustrates a disc drive storage device.

In the embodiments illustrated below, a write coil in a disc drive head is formed as multiple layers of spiral write coils. A bottom spiral write coil, or first layer, is adjacent a shared pole piece and is narrowed where it passes through a window in a write coil window. A top spiral write coil, or second layer, is adjacent a write pole piece and is also narrowed where it passes through the window. The turns of the top spiral write coil are fewer in number and flattened in comparison to the turns in the bottom write coil. The arrangement of multiple layers with the top layers flattened provides improved heat transfer from the top write coil, decreases the local temperatures in the write coil window and enhances the reliability and ambient temperature range of the disc drive head.

Local operating temperatures in a write coil window of a magnetic transducer can be very high and the write coil temperature can approach a thermally activated electromigration limit. When this electromigration limit is exceeded, short circuits can occur through the insulating material that surrounds the write coil.

High operating temperatures in the transducer can also induce domain states in the writer poles that are unsuitable for efficient magnetic flux transmission due to the combined effects of localized thermally induced stresses and the intrinsic magnetostriction in the writer pole materials. These domain states can change rapidly during and after operation of the writer. An extended 'settling' period between the termination of the write operation and error free initiation of the read operation can result.

Such changes in the local stress within the writer can impact the expansion of the pole tip materials, causing a variation in the effective separation between the head and the media on the disc. At high areal densities, these variations in separation can lead to errors or a head crash.

Running at high frequencies present in a high performance disc drive, the writer heats up due to joule heating in the coils and eddy current losses in the core. The coils can break down under the applied current pulses due to thermally activated migration. The insulator between the coils can break down (thermally) causing coil to coil shorting. The writer coil/insulator/yoke region can expand and produce a noisy and inefficient flux transfer domain state, requiring even more current to be driven into the writer to switch the media.

Changes in the writer yoke can vary the effective pole tip recession (PTR), altering the head-media separation (HMS) substantially during a write cycle. Should the shared pole between the reader and the writer get hot due to its operation, then the efficiency by which the shields reduce the temperature of the reader portion of the transducer is reduced. This high temperature of the shared pole limits the maximum current density that can be applied to the reader, and stresses the stability of the magnetic stabilization layers.

With the present invention, many of the thermal problems found in heads of high performance disc drives are greatly reduced.

In FIG. 1, an embodiment of a disc drive storage device 100 is illustrated. Disc drive 100 includes a disc pack 126 having storage surfaces 106 that are typically layers of magnetic material that are deposited using microstructure fabrication techniques. The disc pack 126 includes a stack of multiple discs and the read/write head assembly 112 includes a head 110 with a read/write transducer for each stacked disc surface. The head 110 is typically formed using microstructure fabrication techniques. Disc pack 126 is spun or rotated as shown by arrow 107 to allow read/write head assembly 112 to access different rotational locations for data on the storage surfaces 106 on the disc pack 126.

Read/write head assembly 112 is actuated to move radially, relative to the disc pack 126, as shown by arrow 122 to access different radial locations for data on the storage surfaces 106 of disc pack 126. Typically, the actuation of read/write head assembly 112 is provided by a voice coil motor 118. Voice coil motor 118 includes a rotor 116 that pivots on axle 120 and an arm 114 that actuates the read/write head assembly 112. Disc drive 100 includes electronic circuitry 130 for controlling the operation of the disc drive 100 and transferring data in and out of the disc drive.

The internal arrangement of the read/write head 110 includes multiple layers of spiral coils and is explained in more detail below in connection with an example illustrated in FIGS. 2–5.

Figure 2:
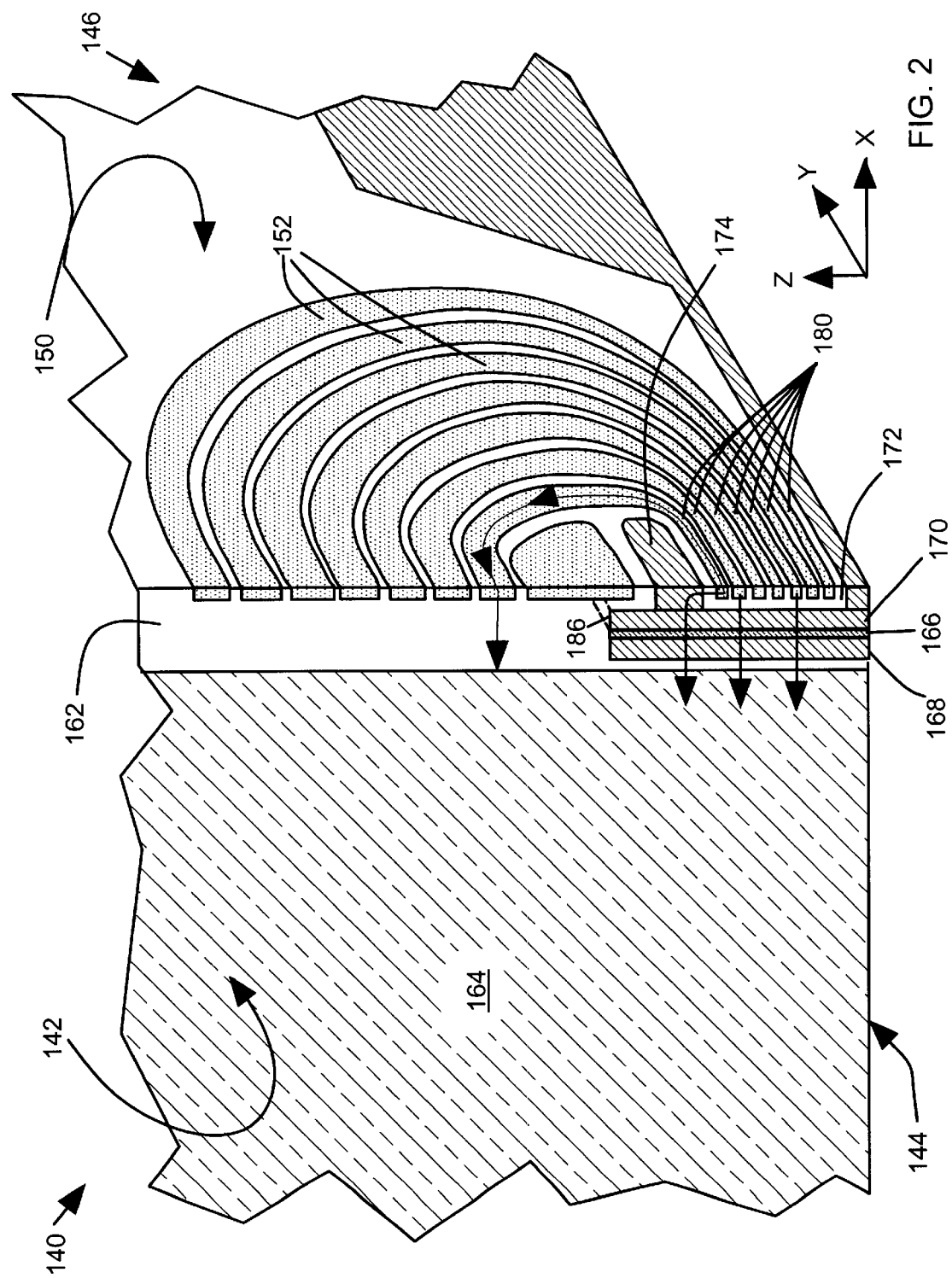
FIG. 2 illustrates a cutaway view of a bottom spiral write coil in a read/write head of a disc drive and heat flow associated with the bottom spiral write coil.
Figure 3:
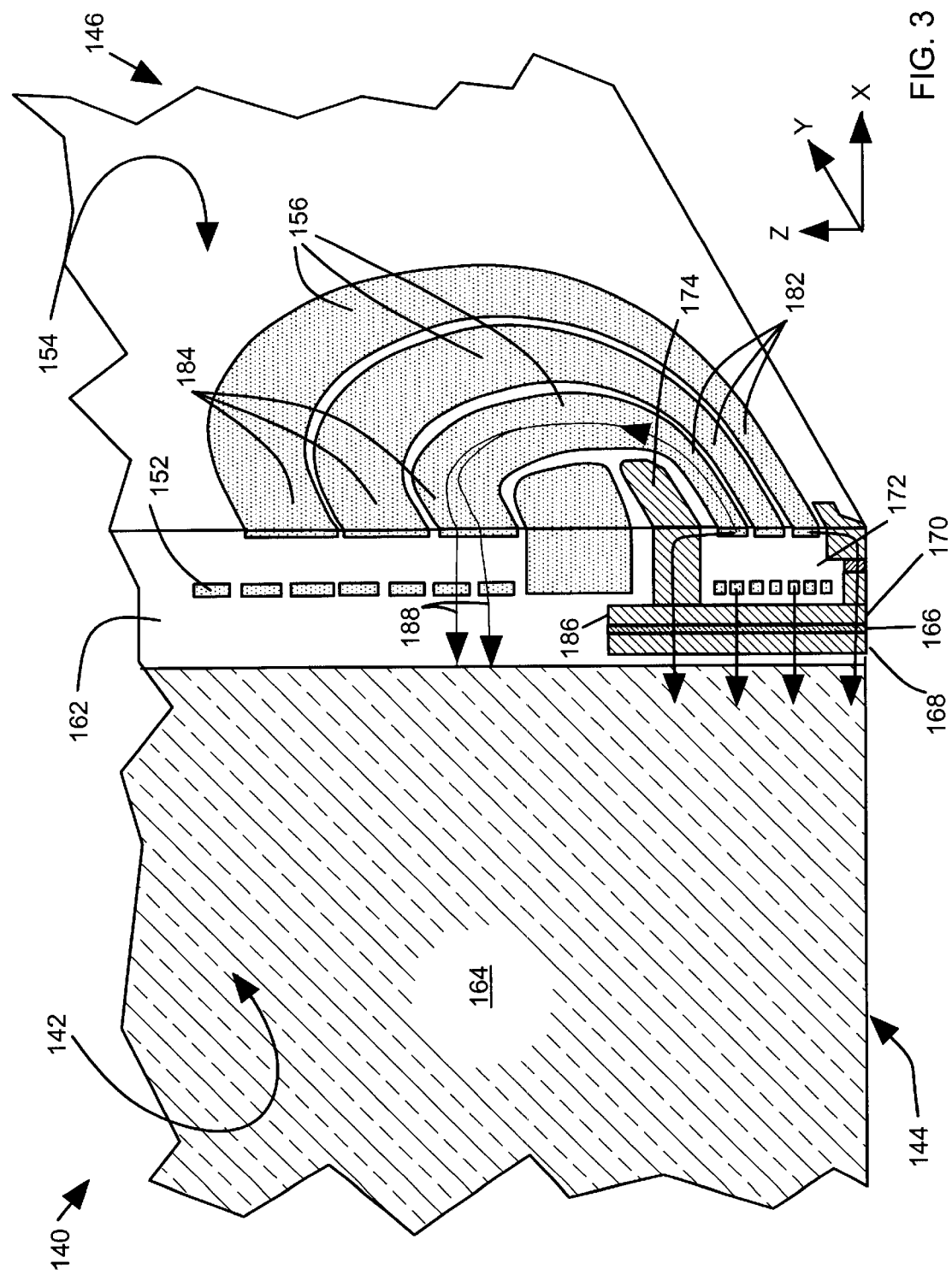
FIG. 3 illustrates a cutaway view of a top spiral write coil in a read/write head of a disc drive and heat flow associated with the top spiral write coil.
Figure 4:
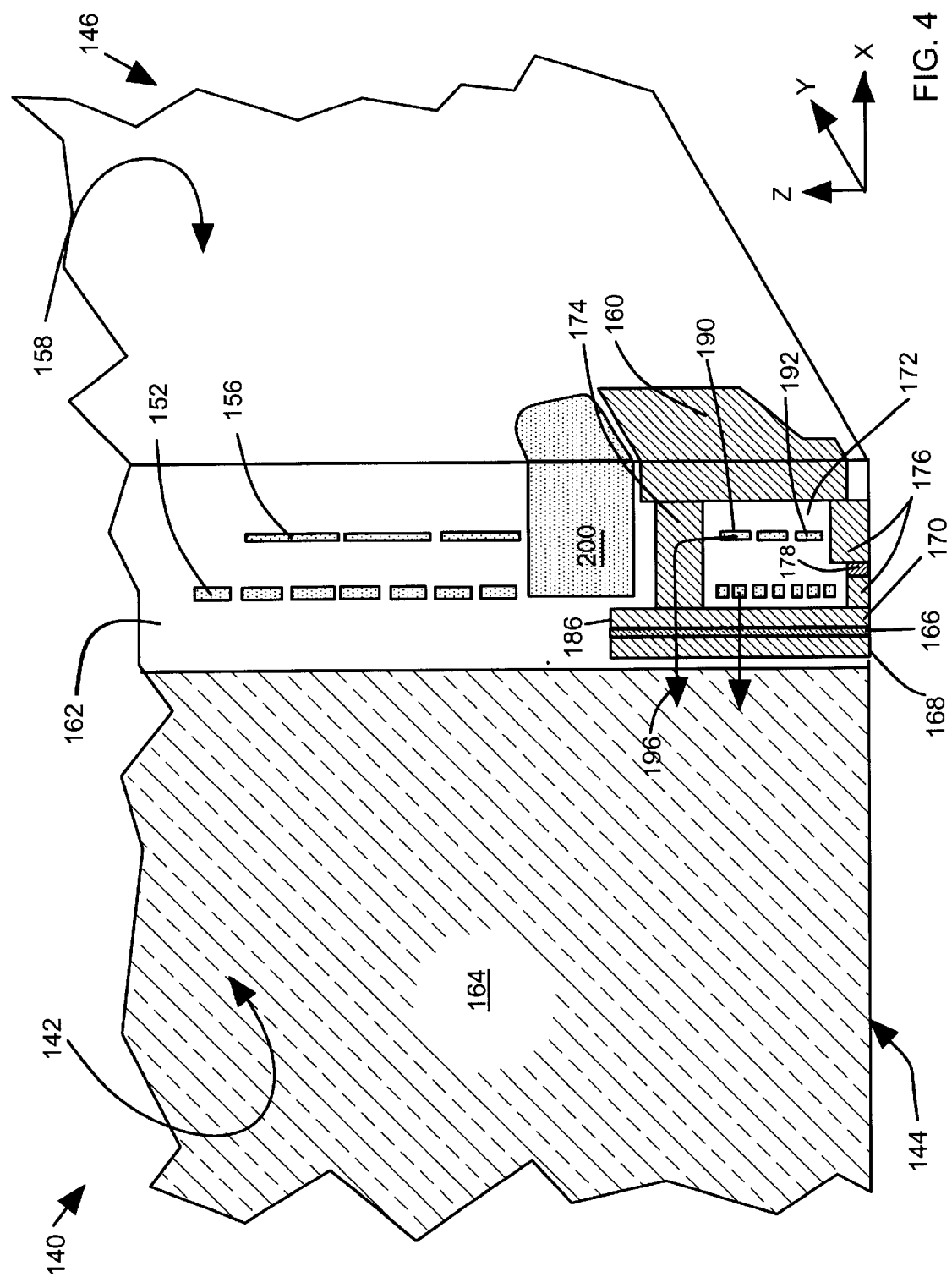
FIG. 4 illustrates a cutaway oblique view of top and bottom spiral write coils in a read/write head of a disc drive.

FIGS. 2–4 illustrate three views of trailing edge of a thin film read/write head 140. Each view in FIGS. 2–4 is sectioned or cutaway along two planes to expose various features of the read/write head 140. Each view in FIGS. 2–4 has a front cutaway surface 142 along an XZ plane that is perpendicular to an air bearing surface 144 generally along an XY plane. Front cutaway surface 142 passes approximately through a center of a magnetic read/write transducer 146. FIG. 2 has a side cutaway surface 150 along a ZY plane exposing a portion of a bottom coil 152. FIG. 3 has a side cutaway surface 154 along a ZY plane exposing a portion of a top coil 156. FIG. 4 has a side cutaway surface 158 along a ZY plane exposing a portion of a write pole piece 160. It will be understood by those skilled in the art that the illustrations in FIGS. 2–4 are not drawn to scale and, in particular, the thickness in the X direction of a refractory material 162 has been exaggerated for clarity.

Referring to FIGS. 2–4, the read/write head 140 includes a substrate 164 that is formed of thermally conductive material. Substrate 164 serves as a heatsink for the heat generated in the magnetic transducer 146. The substrate 164 is preferably formed from an electrically conducting ceramic material, such as a mixture of aluminum oxide ($Al_2O_3$) and titanium carbide (TiC), sometimes referred to as "AlTiC".

The refractory material 162 is deposited on the substrate 164 in multiple layers as other components layers of the magnetic transducer 146 are selectively deposited in the refractory material. Refractory material 162 is a material chosen for stability at high operating temperatures, low loss dielectric properties and good thermal conduction properties. Refractory material 162 typical comprises thin film deposits of alumina, silicon nitride or diamond-like carbon.

Magnetic transducer 146 includes a magnetoresistive read sensor 166 deposited between a read pole 168 and a shared pole 170. The magnetoresistive read sensor 166, the read pole 168 and the shared pole 170 are temperature sensitive components whose operation can be adversely affected by heat generated in adjoining portions of the magnetic transducer 146.

A write coil window 172 (shown most completely in FIG. 4) is surrounded by the shared pole piece 170, that is thermally coupled to the substrate, a central core 174, the write pole piece 160 and a write gap 176. In a preferred arrangement, write gap 176 includes a non-magnetic metal layer 178 filling the gap. The nonmagnetic metallic layer 178 conducts heat from the write pole piece 160 to the shared pole piece 170.

The bottom coil 152 is adjacent the shared pole piece 170 and has a bottom plurality of coil turns that have bottom narrowed regions 180 passing through the window 172. The top coil 156 is adjacent the write pole piece 160 and has a top plurality of coil turns that have top narrowed regions 182 passing through the window 172. The top plurality of coil turns 156 is fewer in number and flattened relative to the bottom plurality of coil turns 152. The top plurality of coil turns 156 have top widened regions 184 opposite the top narrowed regions. The top coils 156 have larger width and cross-sectional area than the bottom coils 152. The coils 152, 156 are kept close to the writer core 174 for increased head conduction through the writer core 174.

The shared pole 170 is truncated along a line 186 between the central core 174 and the top widened regions 184. It is desirable that the shared pole 170 extends little beyond the region 174 connecting the writer pole 160 to the shared pole 170. This truncation cools the high power density regions of the coil, yet restricts the capacitance contribution from the back portion of the coils (which are wider than the region in the window 172) to the shared pole 170 of the writer.

A portion of heat generated in the top narrowed regions 182 is conducted through the top widened regions 184 to the substrate 164 as illustrated by arrows 188 (FIG. 3). The bottom coil 152 and the top coil 156 are embedded in a refractory material 162 that is electrical insulating and thermally conductive. The refractory material 162 preferably comprises material such as alumina, silicon nitride or diamond-like carbon.

The top narrowed regions 182 in the write coil window 172 include an inner turn 190 adjacent the central core 174 with a cross-section that is small relative to a cross-section of an outer turn 192 of the top narrowed region in the write coil window. A portion of the heat generated in the inner turn 190 is conducted through the central core 174 to the substrate 164 as illustrated by arrow 196.

The read/write transducer 146 also includes vias such as via 200 to connect the magnetoresistor 166 and the write coil (i.e., the bottom coil 152 and the top coil 156) to external electrical contacts (not illustrated). The bottom coil 152 and the top coil 156 are preferably connected in series electrically by a via so that the same current write current flows in both the bottom coil 152 and the top coil 156.

Figure 5:
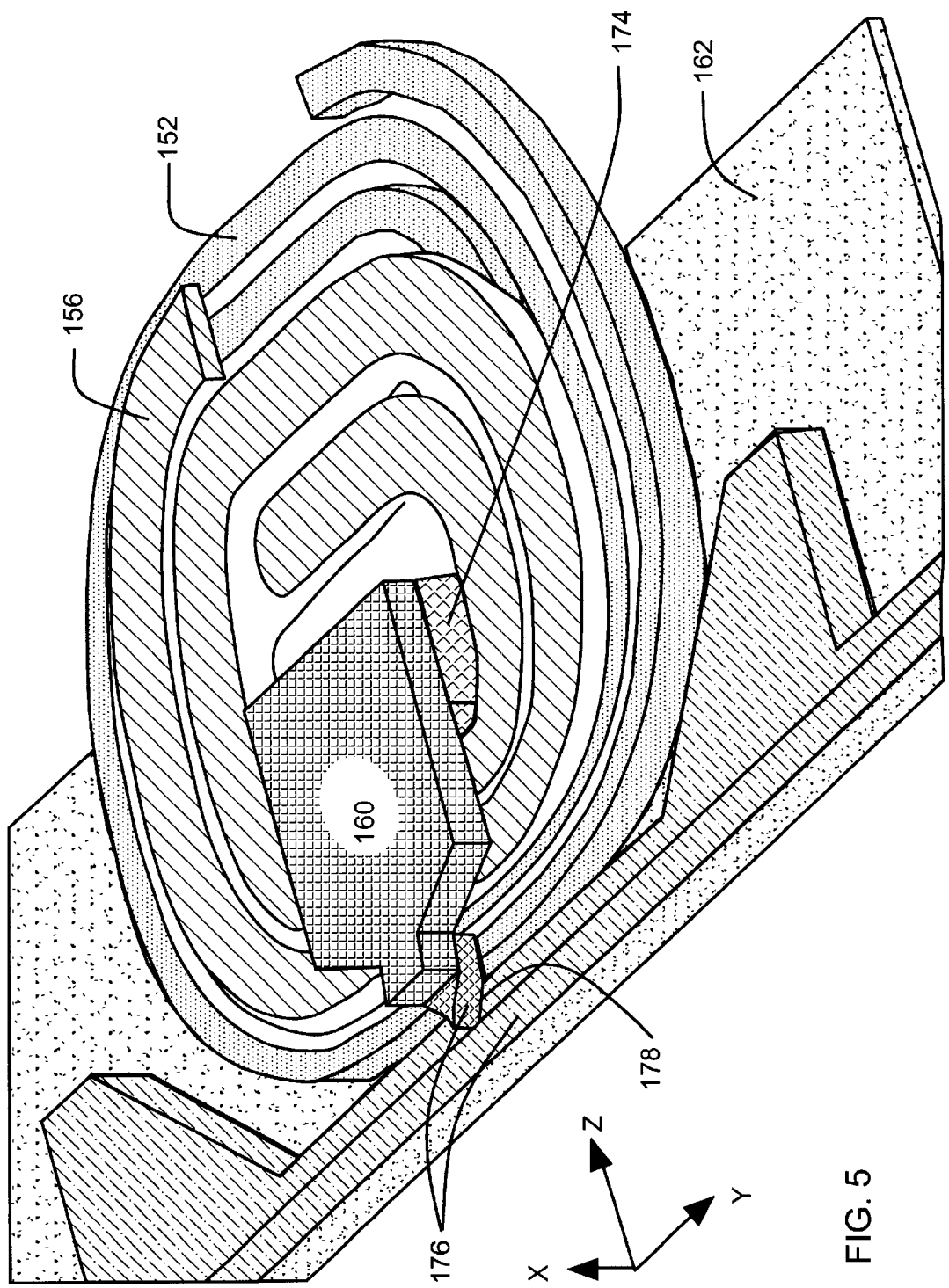
FIG. 5 illustrates an oblique view of top and bottom spiral write coils in a read/write head.

FIG. 5 illustrates an oblique view of top and bottom spiral write coils in the read/write head 140 illustrated in FIGS. 2–4. FIG. 5 is not cutaway through a center of the read/write transducer 146, and better illustrates the spiral arrangement of the bottom coil 152 and the top coil 156.

Points of highest current density within the coils (the inner turns of the bottom coil layer) are placed in close proximity to the yoke 174 in order to heat sink the power generated by these regions of highest current density into the shared pole, and improve the current density and reliability of the writer design.

Reduction of the volume of magnetic material in the writer core structure can reduce the delay in the writer dynamic response. In addition a reduction in the amount of magnetic material experiencing intense high frequency fields from the writer coils tends to render the joule heating effects produced by eddy current losses in the writer core structure less of a significant problem.

In conclusion, a disc drive (100) includes a disc (126) and a read/write head (100, 140) accessing the disc (126). The read/write head (100, 140) includes a substrate (164) formed of thermally conductive material. The read/write head (110, 140) includes a write coil window (172) surrounded by a shared pole piece (170) thermally coupled to the substrate (164), a central core (174), a write pole piece (160) and a write gap (176). The read/write head (100, 140) includes a bottom coil (152) adjacent the shared pole piece (170) having a bottom plurality of coil turns that have bottom narrowed regions (180) passing through the window (172). The read/write head (100, 140) also includes a top coil (156) adjacent the write pole piece (160) having a top plurality of coil turns that have top narrowed regions (182) passing through the window (172). The top plurality of coil turns (156) being fewer in number and flattened relative to the bottom plurality of coil turns (152).

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the read/write head while maintaining substantially the same functionality without departing from the scope and spirit of the present invention. In a further example, the invention can be applied to magnetic core structures generally, such as transformers and inductors, particularly when such magnetic core structures are fabricated using thin film or other microstructure fabrication techniques. In addition, although the preferred embodiment described herein is directed to a read/write head for a thin film head, it will be appreciated by those skilled in the art that the teachings of the present invention can be applied to other fabrication processes, like nanostructure fabrication processes, without departing from the scope and spirit of the present invention.

What is claimed is:

1. A read/write head, comprising:
    a substrate formed of thermally conductive material;
    a write coil window surrounded by a shared pole piece thermally coupled to the substrate, a central core, a write pole piece and a write gap;
    a bottom coil adjacent the shared pole piece having a bottom plurality of coil turns that have bottom narrowed turns that pass through the write coil window and that are horizontally narrowed relative to opposite turns of the bottom coil;
    a top coil adjacent the write pole piece having a top plurality of coil turns that have top narrowed turns that pass through the write coil window and that are horizontally narrowed relative to opposite turns of the top coil; the top plurality of coil turns being fewer in number and vertically flattened relative to the bottom plurality of coil turns; and
    the top narrowed turns overlying the bottom narrowed turns in the write coil window and the top narrowed turns being vertically flattened relative to the bottom narrowed turns in the write coil window.

2. The read/write head of claim 1 wherein the top plurality of coil turns have top widened turns opposite the top narrowed turns.

3. The read/write head of claim 2 wherein the shared pole is truncated along a line between the central core and the top widened turns.

4. The read/write head of claim 2 wherein a portion of heat generated in the top narrowed turns is conducted through the top widened turns to the substrate.

5. The read/write head of claim 1 wherein the bottom coil and the top coil are embedded in a refractory material that is electrically insulating and thermally conductive.

6. The read/write head of claim 5 wherein the refractory material comprises material selected from the group: alumina, silicon nitride and diamond-like carbon.

7. The read/write head of claim 1 wherein the top narrowed turns in the write coil window include an inner turn adjacent the central core with a cross-section that is small relative to a cross-section of an outer turn of the top narrowed turns in the write coil window.

8. The read/write head of claim 7 wherein a portion of the heat generated in the inner turn is conducted through the central core to the substrate.

9. The read/write head of claim 1 wherein the write gap includes a nonmagnetic metallic layer.

10. The read/write head of claim 9 wherein the nonmagnetic metallic layer conducts heat from the write pole piece to the shared pole piece.

11. A read/write head, comprising:
    a read/write head with a top coil and a bottom coil in a write portion of the head formed on a substrate; the read/write head accessing a disc;
    means for conducting heat from a top coil in the read/write head to a substrate in the read/write head; and
    the top coil including top narrowed turns that are horizontally narrowed in a write coil window relative to opposite turns of the top coil and that overlie bottom narrowed turns of the bottom coil, the bottom narrowed turns being horizontally narrowed in the write coil window relative to opposite turns of the bottom coil, and the top narrowed turns being vertically flattened relative to the bottom narrowed turns.

12. A method of manufacturing a read/write head, comprising:
    forming a read/write head substrate of thermally conductive material;
    surrounding a write coil window in the read/write head with a shared pole piece thermally coupled to the substrate, a central core, a write pole piece and a write gap;
    providing a bottom coil adjacent the shared pole piece having a bottom plurality of coil turns that have bottom narrowed turns that are horizontally narrowed relative to opposite turns of the bottom coil and that pass through the write coil window;
    providing a top coil adjacent the write pole piece with a top plurality of coil turns that have top narrowed turns that are horizontally narrowed relative to opposite turns of the top coil and that pass through the write coil window; the top plurality of coil turns being fewer in number and vertically flattened relative to the bottom plurality of coil turns; and positioning the top narrowed turns to overlie the bottom narrowed turns in the write coil window, and shaping the top narrowed turns to be vertically flattened relative to the bottom narrowed turns in the write coil window.

13. The method of claim 12 and further comprising:

providing the top plurality of coil turns with top widened turns opposite the top narrowed turns.

14. The method of claim 13 further comprising:

truncating the shared pole along a line between the central core and the top widened turns.

15. The method of claim 13 further comprising:

conducting a portion of heat generated in the top narrowed turns through the top widened turns to the substrate.

16. The method of claim 12 further comprising:

embedding the bottom coil and the top coil in a refractory material that is electrically insulating and thermally conductive.

17. The method of claim 16 further comprising:

selecting the refractory material from the group: alumina, silicon nitride and diamond-like carbon.

18. The method of claim 12 further comprising:

including, in the top narrowed turns in the write coil window, an inner turn adjacent the central core with a cross-section that is small relative to a cross-section of an outer turn of the top narrowed turns in the write coil window.

19. The method of claim 18 further comprising:

conducting a portion of the heat generated in the inner turn through the central core to the substrate.

20. The method of claim 12 further comprising:

including a nonmagnetic metallic layer in the write gap.

21. A magnetic coil assembly, comprising:

a substrate formed of thermally conductive material;

a magnetic core structure surrounding a write coil window, the magnetic core structure including a core portion that is thermally coupled to the substrate;

a bottom coil adjacent the core portion, the bottom coil having a bottom plurality of coil turns that have bottom narrowed turns that are horizontally narrowed relative to opposite turns of the bottom coil and that pass through the write coil window; and a top coil overlying the bottom coil, the top coil having a top plurality of coil turns that have top narrowed turns that are horizontally narrowed relative to opposite turns of the top coil and that pass through the write coil window; the top plurality of coil turns being fewer in number and vertically flattened relative to the bottom plurality of coil turns, and the top narrowed turns overlying the bottom narrowed turns in the write coil window and the top narrowed turns being vertically flattened relative to the bottom narrowed turns in the write coil window.

22. The magnetic coil assembly of claim 21 wherein a portion of heat generated in the top narrowed turns is conducted through the opposite turns of the top coil to the substrate.

23. The magnetic coil assembly of claim 21 wherein the bottom coil and the top coil are embedded in a refractory material that is electrically insulating and thermally conductive.

24. The magnetic coil assembly of claim 21 wherein the refractory material comprises material selected from the group: alumina, silicon nitride and diamond-like carbon.

25. The magnetic coil assembly of claim 21 further comprising a central core, wherein the top narrowed turns in the write coil window include an inner turn adjacent the central core with a cross-section that is small relative to a cross-section of an outer turn of the top narrowed turns in the write coil window.

* * * * *